Patented June 13, 1939

2,162,028

UNITED STATES PATENT OFFICE 2,162,028

CELLULOSE ETHER COATING COMPOSITION

Irving E. Muskat, Akron, Ohio, assignor to Pittsburgh Plate Glass Company, Allegheny County, Pa., a corporation of Pennsylvania No Drawing. Application June 25, 1938, Serial No. 215,871

11 Claims. (Cl. 134—79)

This invention relates to cellulose ether coating compositions which are capable of forming flexible, impermeable chemically-resistant films which are adherent to metallic and other surfaces. It has been previously recognized that cellulose ethers such as ethyl cellulose are highly resistant to the action of certain chemicals, in particular, caustic-soda solutions in concentration of 50 percent or above. The nature of cellulose ethers is such that their use per se is not suitable for many purposes, and it is often desirable to resort to the use of a plasticizer in order to improve the plasticity or workability of the ether.

Great difficulty has been encountered in the selection of materials which are compatible with the cellulose ether and which, at the same time, are chemically inert and are capable of plasticizing the ether to the extent required for the production of an effective coating composition. The problem is particularly acute when it is desired to provide a composition which will form films which will resist the attack of corrosive chemicals such as alkali metal hydroxides or carbonates, sulphuric acid, hydrochloric acid, etc.

In storing these chemicals, it has been found that they attack the equipment to an undesirable degree and consequently the chemical becomes contaminated. Attempts to prevent this attack by use of cellulose ether coatings plasticized with the ordinary cellulose plasticizers have been unsuccessful.

In accordance with my invention, I have found that cellulose ethers may be plasticized with an alkylated naphthalene, particularly an amyl naphthalene, such as mono- or diamyl naphthalene and that the coating composition thus formed is capable of forming chemically inert films of great toughness, wear-resistance, and impermeability which will resist the attack of such chemicals as concentrated aqueous solutions of sodium hydroxide, hydrochloric acid, sulphuric acid, etc.

The compositions which are formed in this manner have been found to be particularly effective in coating tank, tank cars, etc., in which concentrated solutions of sodium hydroxide are stored. In storing solutions of sodium hydroxide having a concentration of 50 percent and above, it is essential that the tanks be unattacked by the hydroxide since contamination of the solution would otherwise occur thus producing a commercially degraded product. Seventy percent solutions of sodium hydroxide, for example, are normally solid at room temperature and the usual practice is to melt such products by heating to a temperature of about 200° F. in order to facilitate loading or unloading. At such temperatures, concentrated caustic is extremely corrosive and prior to my invention, no plasticized composition capable of withstanding the vigorous attack of this material was known. However, cellulose ether, plasticized with an alkyl naphthalene in accordance with my invention, is capable of forming adherent films upon the exposed surfaces of tanks, tank cars or other metallic element which are impervious and chemically resistant to caustic solutions of this concentration even at temperatures materially higher than 200° F.

Various alkyl naphthalenes have been found to be suitable for this purpose. Thus, while the amyl naphthalenes, particularly diamyl naphthalene, have been found to be especially effective, various other compounds such as the propylated, butylated, hexylated, cyclohexylated, or benzylated naphthalenes or similar compounds where the side chains may be normal or branched and one or more in number have been found suitable for many purposes. In addition, the composition is not limited to the use of ethyl cellulose since other cellulose ethers such as aliphatic ethers, for example, butyl, propyl, or methyl cellulose or the aromatic ethers such as benzyl, or ethyl benzyl cellulose and the like may be used in lieu thereof to produce acceptable compositions.

The concentration of plasticizer may be widely varied depending upon the type of composition desired. In general, it is found desirable to incorporate 10 to 30 percent of the plasticizer based upon the weight of the cellulose ether used; however, other concentrations may be used, if desired.

Various common solvents, such as methyl or ethyl alcohol, cellosolve, cellosolve acetate, xylene, toluene, etc., may be used in order to apply the composition. If desired, suitably inert pigments such as titanium dioxide, ground mica, etc., may be incorporated. The product may also be modified, if desired, by incorporation of other plasticizers, such as chlorinated diphenyl, diamyl phthalates, etc.

The following example is illustrative of the coating composition made in accordance with this invention.

| | Parts by weight |
|---|---|
| Diamyl naphthalene | 1.5 |
| Ethyl cellulose | 6 |
| Titanium dioxide | 3 |
| Ethyl alcohol | 22.5 |
| Toluene | 42.7 |
| Xylene | 22.5 |
| Methyl cellosolve acetate | 2.3 |

The composition, while particularly effective when applied to chemical apparatus is capable of general use and may be used as a decorative or weather-resistant coating for dwellings, steel frameworks, automobile bodies or other structures.

Although the present invention has been described in connection with the specific details of certain embodiments thereof, it is not intended that such details shall be regarded as limitations upon the scope of the invention except insofar as included in the accompanying claims. This application is a continuation in part of my co-pending application, Serial No. 161,797, filed August 31, 1937.

I claim:

1. A coating composition, capable of forming tough adherent, impermeable films which are resistant to the attack of corrosive chemicals, which comprises 1.5 parts by weight of diamyl naphthalene, 6 parts by weight of ethyl cellulose, 3 parts by weight of titanium dioxide, 22.5 parts by weight of ethyl alcohol, 42.7 parts by weight of toluene, 22.5 parts by weight of xylene, and 2.3 parts by weight of methyl cellosolve acetate.

2. A coating composition capable of forming tough, adherent, impermeable films, which are resistant to the attack of corrosive chemicals, which comprises ethyl cellulose and 10 to 30 percent by weight of an alkyl naphthalene based upon the weight of the ethyl cellulose and a volatile liquid which is a common solvent for the ethyl cellulose and the alkyl naphthalene.

3. A coating composition capable of forming tough, adherent, impermeable films, which are resistant to the attack of corrosive chemicals, which comprises a cellulose ether and 10 to 30 percent by weight of an alkyl naphthalene based upon the weight of the cellulose ether and a volatile liquid which is a common solvent for the cellulose ether and the alkyl naphthalene.

4. The composition defined in claim 2 wherein the alkyl naphthalene is amyl naphthalene.

5. A composition of matter capable of forming tough, wear-resistant, impermeable films which are resistant to the attack of corrosive chemicals, which comprises a cellulose ether, an alkyl naphthalene in an amount sufficient to effectively plasticize the cellulose ether and a volatile liquid which is a common solvent for said ether and said alkyl naphthalene.

6. A composition of matter capable of forming tough, wear-resistant, impermeable films which are resistant to the attack of corrosive chemicals, which comprises an ethyl cellulose, an alkyl naphthalene in an amount sufficient to effectively plasticize the ethyl cellulose and a volatile liquid which is a common solvent for said ethyl cellulose and said alkyl naphthalene.

7. A composition of matter capable of forming tough, wear-resistant, impermeable films, which are resistant to the attack of corrosive chemicals, which comprises an ethyl cellulose, amyl naphthalene in an amount sufficient to effectively plasticize the ethyl cellulose and a volatile liquid which is a common solvent for said ethyl cellulose and said amyl naphthalene.

8. A composition of matter capable of forming tough, wear-resistant, impermeable films, which are resistant to the attack of corrosive chemicals, which comprises an ethyl cellulose, diamyl naphthalene in an amount sufficient to effectively plasticize the ethyl cellulose and a volatile liquid which is a common solvent for said ethyl cellulose and said diamyl naphthalene.

9. A coating composition capable of forming tough, wear-resistant, impermeable films which are resistant to the attack of corrosive chemicals, which comprises a cellulose ether and an alkyl naphthalene in an amount sufficient to effectively plasticize said ether.

10. A coating composition capable of forming tough, wear-resistant, impermeable films which are resistant to the attack of corrosive chemicals, which comprises an ethyl cellulose and an alkyl naphthalene in an amount sufficient to effectively plasticize said ether.

11. A coating composition capable of forming tough, wear-resistant, impermeable films which are resistant to the attack of corrosive chemicals, which comprises an ethyl cellulose and an amyl naphthalene in an amount sufficient to effectively plasticize said ether.

IRVING E. MUSKAT.